United States Patent
Goulart et al.

(10) Patent No.: US 10,318,999 B2
(45) Date of Patent: Jun. 11, 2019

(54) METHODS AND SYSTEMS TO FACILITATE MESSAGING TO CUSTOMERS

(71) Applicant: Wal-Mart Stores, Inc., Bentonville, AR (US)

(72) Inventors: Valerie Goulart, Seattle, WA (US); Stefan Li, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 905 days.

(21) Appl. No.: 14/015,267

(22) Filed: Aug. 30, 2013

(65) Prior Publication Data

US 2015/0066802 A1 Mar. 5, 2015

(51) Int. Cl.
| | |
|---|---|
| *G06Q 30/02* | (2012.01) |
| *H04W 4/04* | (2009.01) |
| *H04W 24/08* | (2009.01) |
| *H04W 4/21* | (2018.01) |
| *H04W 4/20* | (2018.01) |
| *G06F 21/35* | (2013.01) |
| *H04W 68/00* | (2009.01) |
| *H04W 84/12* | (2009.01) |
| *G01S 5/02* | (2010.01) |

(52) U.S. Cl.
CPC ......... *G06Q 30/0281* (2013.01); *G06F 21/35* (2013.01); *H04W 4/04* (2013.01); *H04W 4/206* (2013.01); *H04W 4/21* (2018.02); *H04W 24/08* (2013.01); *H04W 68/00* (2013.01); *G01S 5/02* (2013.01); *G06F 2221/2101* (2013.01); *H04W 4/043* (2013.01); *H04W 84/12* (2013.01)

(58) Field of Classification Search
CPC . G06Q 30/0281; H05K 999/00; H04W 24/08; H04W 4/04
See application file for complete search history.

(56) References Cited

U.S. PATENT DOCUMENTS

| | | | |
|---|---|---|---|
| 6,659,344 B2 | 12/2003 | Otto | |
| 7,063,263 B2 | 6/2006 | Swartz | |
| 7,246,083 B2 | 7/2007 | Bibelnieks | |
| 7,580,699 B1 | 8/2009 | Shaw | |
| 8,165,561 B2 * | 4/2012 | Cai | H04W 4/02 455/404.2 |

(Continued)

OTHER PUBLICATIONS

Recent Advances in Wireless Indoor Localization Techniques and Systems; Farid Zahid and Mahamod Ismail, Journal of Computer Networks and Communications, May 2013 (Year: 2013).*

*Primary Examiner* — Dennis W Ruhl
(74) *Attorney, Agent, or Firm* — Bryan Cave Leighton Paisner LLP

(57) ABSTRACT

Techniques for providing notifications to a customer shopping at a brick and mortar store are disclosed. The techniques include providing a wireless network in a brick and mortar store, using a customer mobile electronic device to detect network identification data of the wireless network, and using a communications module to determine, from the network identification data, the location of the mobile electronic device within the brick and mortar store. The techniques also include a server selecting, based on the location of the mobile electronic device within the brick and mortar store, a notification which is related to a location within the brick and mortar store and transmitting the notification to the mobile electronic device.

20 Claims, 10 Drawing Sheets

(56) References Cited

U.S. PATENT DOCUMENTS

| | | | |
|---|---|---|---|
| 8,838,706 B2* | 9/2014 | Zhao | G06Q 30/0251 709/206 |
| 2006/0194569 A1* | 8/2006 | Hsueh | G06Q 30/02 455/412.1 |
| 2008/0240016 A1* | 10/2008 | Cai et al. | 370/328 |
| 2008/0262928 A1* | 10/2008 | Michaelis | G06Q 30/02 705/14.26 |
| 2010/0179877 A1* | 7/2010 | Lam | 705/14.55 |
| 2010/0313142 A1 | 12/2010 | Brown | |
| 2011/0028160 A1* | 2/2011 | Roeding et al. | 455/456.1 |
| 2011/0093344 A1 | 4/2011 | Burke | |
| 2011/0320539 A1* | 12/2011 | Zhao et al. | 709/206 |
| 2012/0173351 A1* | 7/2012 | Hanson et al. | 705/17 |
| 2012/0239500 A1* | 9/2012 | Monahan | 705/14.58 |
| 2014/0058841 A1* | 2/2014 | Getchius | G06Q 30/02 705/14.58 |
| 2014/0108149 A1* | 4/2014 | Jabara | G07F 17/3218 705/14.64 |
| 2015/0119071 A1* | 4/2015 | Basha et al. | 455/456.1 |

* cited by examiner

US 10,318,999 B2

METHODS AND SYSTEMS TO FACILITATE MESSAGING TO CUSTOMERS

BACKGROUND INFORMATION

Field of the Disclosure

The present invention relates to sending notifications to customers. In particular, examples of the present invention relate to an approach for transmitting messages to customers who are at a retail store based on their location within the store.

Background

Many stores sell a considerable number of items. Modern supermarkets or super centers sell a significant variety of items, including groceries, home goods, automotive goods, sporting goods, etc. As consumer electronic technology progresses and is widely adopted, customers and store increasingly desire a more interactive shopping experience. Customers desire to use their electronic devices as part of a retail shopping experience. A wide variety in customer adopted technology and an increasing number of types of items sold in a retail store makes it increasingly more difficult to provide meaningful communications with a customer.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
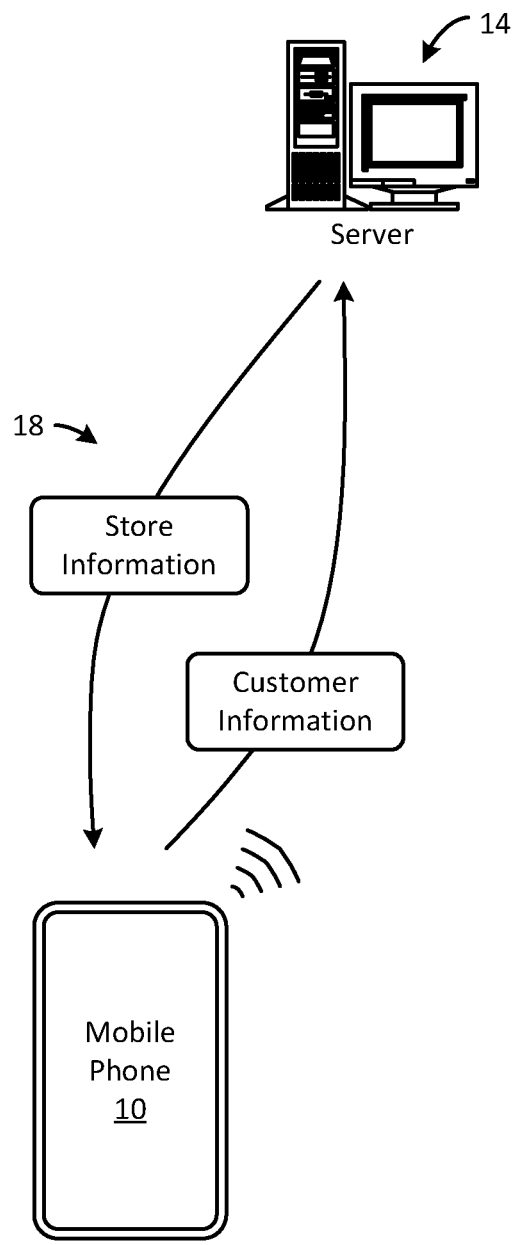
FIG. 1 is a schematic illustrating an embodiment of data transfer between a server and a mobile electronic device.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The disclosure particularly describes how vendors may communicate with customers. In particular, the present disclosure describes how an in-store WIFI network may be used to communicate with customers in the store. A WIFI network may be used to provide notifications to customers based on their current shopping activities and provide notifications which are meaningful to a customer. Although particular examples discussed herein refer to a WIFI network, similar systems and methods may be used with any type of wireless communication network utilizing any communication protocol.

Referring to FIG. 1, a customer may shop at a store. The store may be a retail location which is part of a larger corporate environment which may provide additional avenues of interface with a customer such as additional retail stores and online interactions. In a modern shopping environment, a store may include both a brick and mortar retail location and an on line retail location and/or customer portal. The store may include a server as well as other supporting systems to manage and support sales at the store and to facilitate communication with a customer.

A repeat customer who is interacting with the store more frequently will typically desire an increased measure of communications with the store. For example, a customer may desire personalized coupons from the store. The customer may also desire to use a mobile electronic device 10 (such as a tablet computer or a mobile phone) to manage their shopping with the store. In order to provide an improved shopping experience to a customer, the store may provide software which the customer may install on their mobile electronic device 10. The customer may download or may already have downloaded mobile-shopping software from a store server 14 to their mobile electronic device 10. A customer may have previously received an invitation to download and use mobile-shopping software from a paper receipt, friend, in-store advertisement, website, etc. and may have installed mobile-shopping software on the mobile electronic device 10.

As indicated at 18, the customer may have downloaded mobile-shopping software from the server 14 and may have created an account with the server 14. The server 14 may be a server pertaining to a particular store or, in many examples, may be a server pertaining to a larger corporate environment and multiple individual stores. The customer may transmit information to the server 14. The computer server 14 may likewise transmit information to the mobile device 10. The customer may receive mobile-shopping software on the mobile device 10 which may enable them to manage their in-store shopping experience with their mobile electronic device. The mobile-shopping software may allow the customer to interact with a store point of sale (POS) system via the mobile electronic device 10. The mobile-shopping software may allow the customer to receive electronic receipts, create shopping lists, etc. The mobile-shopping software may allow the customer to receive notifications from the store. The server 14 and other devices may facilitate communication with the mobile electronic device 10. Multiple customers may download self-checkout software as discussed above.

These customers may create accounts with the server 14. A customer may create an account which contains customer identification and contact information, customer preferences, etc. The server 14 may also track a customer's purchase history. The server 14 may create and store a customer profile with such information.

Figure 2:
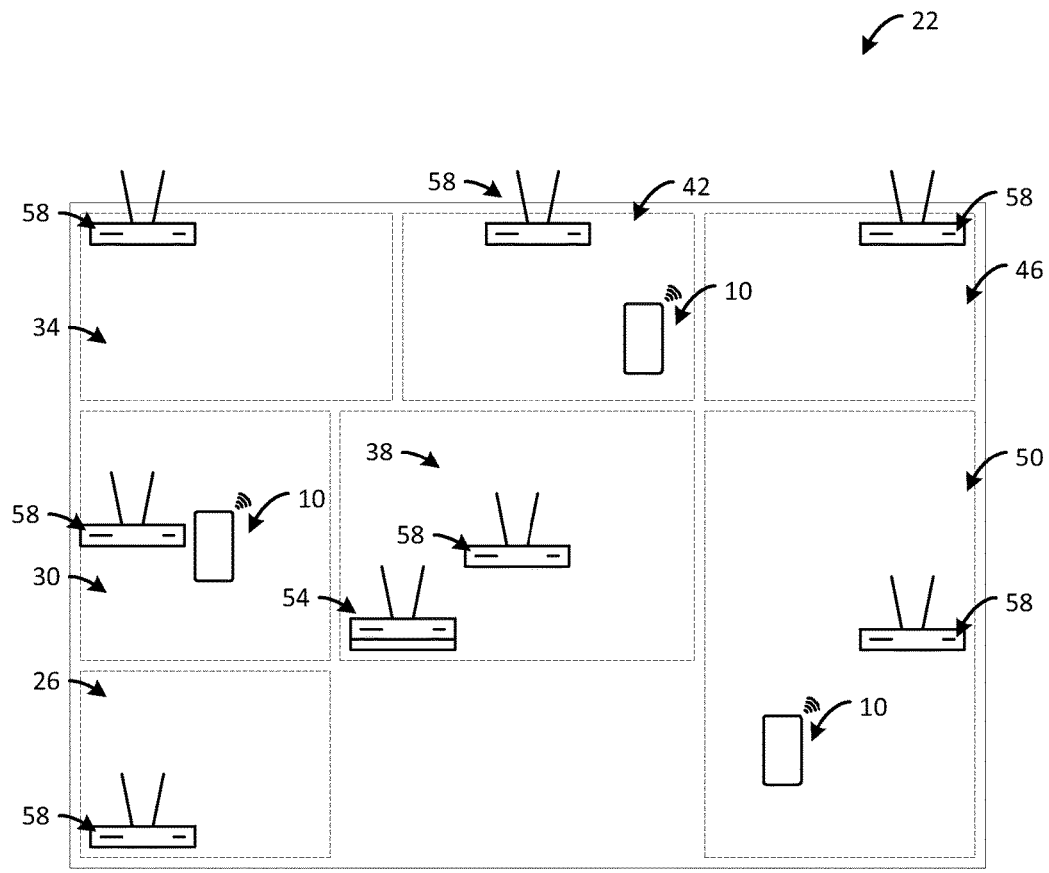
FIG. 2 is a schematic illustrating various aspects of an example store.

The server 14 may be part of a larger computer system which facilitates customer communication within a brick and mortar retail location and within a larger store corporate environment. The computer system may be particularly programmed and configured to provide customized communications to a customer while the customer is shopping at a retail location 22. FIG. 2 shows a brick and mortar store 22.

A store 22 typically includes multiple store sections with different types of products for sale. As an example, the store 22 may include a produce section 26, a grocery section 30, a bakery 34, a clothing section 38, a toys section 42, an electronics section 46, a home goods section 50, and other sections. The store 22 may utilize a computer system which allows the store to send communications to a customer based on their current location within the store as well as other factors.

To facilitate such communications, a store computer system may include various communications devices throughout the store 22 and may support or provide communications access to a customer mobile electronic device 10. The store computer system may include a communications device such as a WIFI access point 54 which provides wireless communications to a customer mobile electronic device 10. WIFI access point 54 may be an open network which provides access to all customers who are inside of the store. Alternatively, the WIFI access point 54 may allow WIFI communications through the mobile-shopping software installed on the customer's mobile electronic device 10. The mobile-shopping software may contain a customer identification and passkey and, upon a customer entering the store 22 with such a mobile electronic device 10, automatically connect to the WIFI access point 54 and provide wireless communications to the mobile electronic device 10.

The store computer system may further include various WIFI beacons 58 located throughout the store 22. The WIFI beacons 58 may operate differently than the WIFI access point 54. In an example system, the WIFI beacons may be WIFI access point hardware which has the communications capability normally associated with a WIFI access point. The WIFI beacons may be configured to not provide WIFI access to the mobile electronic device 10. Each of the WIFI beacons 58 may broadcast a distinct network identification. Each of the WIFI beacons may be secured so that customers cannot access the WIFI network.

The mobile electronic devices 10 may thus detect the presence of the WIFI beacons 58. The mobile electronic devices may detect the network identifier (i.e. SSID) and determine the signal strength from the WIFI beacons. Thus, the mobile electronic device 10 may obtain information regarding surrounding networks from the WIFI beacons. The mobile-shopping software may receive surrounding networks information associated with the WIFI beacons from the mobile electronic device 10 and may transmit this information to the store computer system.

The store computer system may use the information regarding surrounding networks to determine if a customer is inside of a store 22. The store computer system may use the surrounding networks information to further determine where a customer is within the store 22.

In one example, the WIFI beacons 58 may each be set with a broadcast range (i.e. broadcast power level) which corresponds to the size of the store section where the WIFI beacon is located. Thus, a WIFI beacon 58 located in the produce section 26 may have a broadcast range which allows this WIFI beacon to be detected by mobile electronic devices which are in or near the produce section.

In another example, the WIFI beacons 58 may each be set with a broadcast range which is greater than the size of the store section where the WIFI beacon is located. Each of the WIFI beacons 58 may be set with a range which covers the store section where the WIFI beacon is located as well as adjacent store sections. Thus, a WIFI beacon 58 located in the produce section 26 may have a broadcast range which allows this WIFI beacon to be detected by mobile electronic devices which are in or near the produce section 26, grocery section 30, and clothing section 38. Mobile electronic devices 10 may detect the WIFI beacons 58 which are within range and may determine a signal strength for each of these WIFI beacons.

In another example, the WIFI beacons 58 may each be set with a broadcast range which extends throughout most or all of the store 22. Thus, a WIFI beacon 58 located in the produce section 26 may have a broadcast range which allows this WIFI beacon to be detected by mobile electronic devices which are in the store 22. Mobile electronic devices 10 may detect the WIFI beacons 58 and may determine a signal strength for each of these WIFI beacons.

The mobile-shopping software may transmit information regarding the WIFI beacons to the store computer system via the mobile electronic device 10 and, in one example, via the WIFI access point 54. Thus, the mobile electronic device 10 may transmit to the store computer system identifying information such as a network identification (i.e. SSID) and signal strength for the WIFI beacons 58 which are detected by the mobile electronic device 10. The store computer system may receive this information from all enabled mobile electronic devices 10 which are in the store 22.

The store computer system may, from the received WIFI beacon information, determine an approximate location within the store 22 for each such mobile electronic device 10. The store computer system may transmit notifications to a mobile electronic device based on its location within the store and also based on additional customer information associated with a customer profile stored by the computer system.

The store computer system may use a layout of the store to determine customer proximity to different sections of the store. For example, the store computer system may determine that a customer who is in the electronic section 46 is also near the toy section 42 and the home goods section 50. Alternatively, the store computer system may identify a store section where a mobile electronic device 10 is located and also identify adjacent store sections based on signal strength alone.

Figure 3:
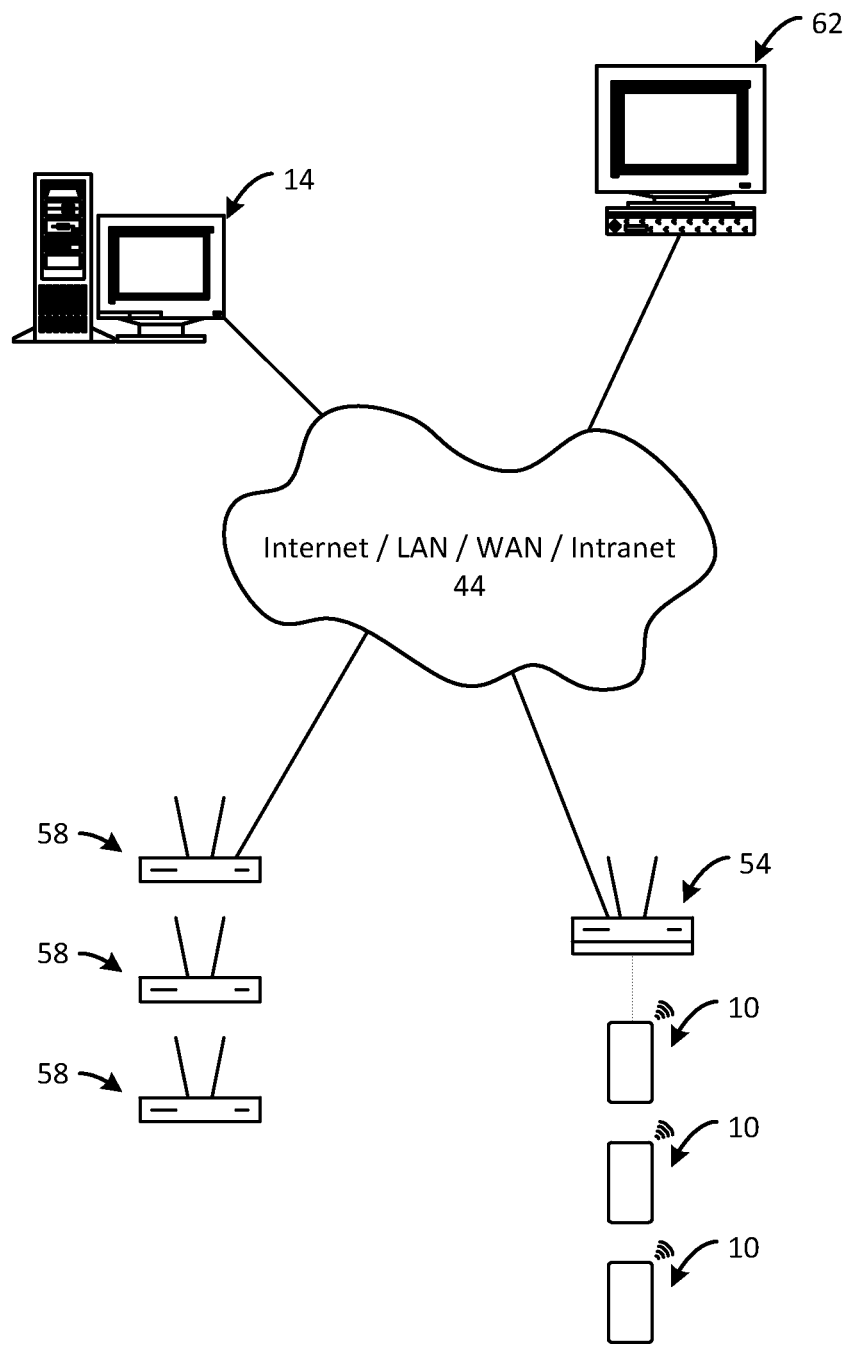
FIG. 3 is a schematic illustrating aspects of an example store computer system.

Turning now to FIG. 3, a schematic illustrating a store computer system is shown. The software, hardware, and associated components of a store computer system may be programmed and configured to implement one or more examples described herein. The store computer system may include a server 14 or other computer which functions as discussed to receive, store, and manage customer information, receive WIFI beacon information, and manage communications with customer via mobile electronic devices 10. The server 14 may communicate with other computer devices via the internet/LAN 44. The store computer system may also include an additional computer 62 which may work with the server 14. The computer 62 may form part of a POS (point of sale) system and may provide customer purchase information to the server 14 to allow the server 14 to provide customized messages to customers.

A store computer 62 may also communicate with or manage WIFI access point 54 and WIFI beacons 58. The computer 62 may manage network traffic through WIFI access point 54 and may provide various services such as threat prevention, routing, etc. The computer 62 may also assist in routing information between the WIFI access point 54, WIFI beacons 58, and the server 14.

The store computer system may include one or more WIFI access points 54. The WIFI access points 54 are programmed and configured to provide WIFI access to customer mobile electronic devices 10. As discussed, the WIFI access points may provide open network access which allows any person in the store 22 to receive WIFI access on a mobile electronic device 10. Alternatively, the WIFI access point 54 may provide WIFI access to mobile electronic devices 10 which have mobile-shopping software on the device 10. In this example, the mobile-shopping software may have a customer/device identification and a network password and may automatically authenticate a customer's mobile electronic device 10 to the WIFI access point 54.

One or more WIFI beacons 58 may be located throughout the store 22. As discussed, a customer mobile electronic device 10 may identify the WIFI beacons as network devices which are within range. These surrounding network devices 58 may be identified by a mobile electronic device 10 along with a network identification (SSID) and, if desired, a signal strength associated with the WIFI beacons 58. The mobile-shopping software may, via the mobile electronic device 10 and the WIFI access point 54, transmit information regarding the WIFI beacons which are within range to the server 14.

The server 14 may receive information from one or more mobile electronic devices 10 regarding surrounding WIFI beacons 58. The server 14 may also contain customer information in a customer profile associated with a mobile electronic device. The server 14 may send messages to a customer via a mobile electronic device 10 based on the customer's location within the store 22. These messages may also be based on past purchase history and other customer profile information.

Various parts of a store computer system including a POS system, server 14, and WIFI devices may allow a customer to receive personalized notifications from the store 22 while the customer is in the store. These notifications may be pertinent to the customer's location within the store and the customer profile and purchase history.

Figure 4:
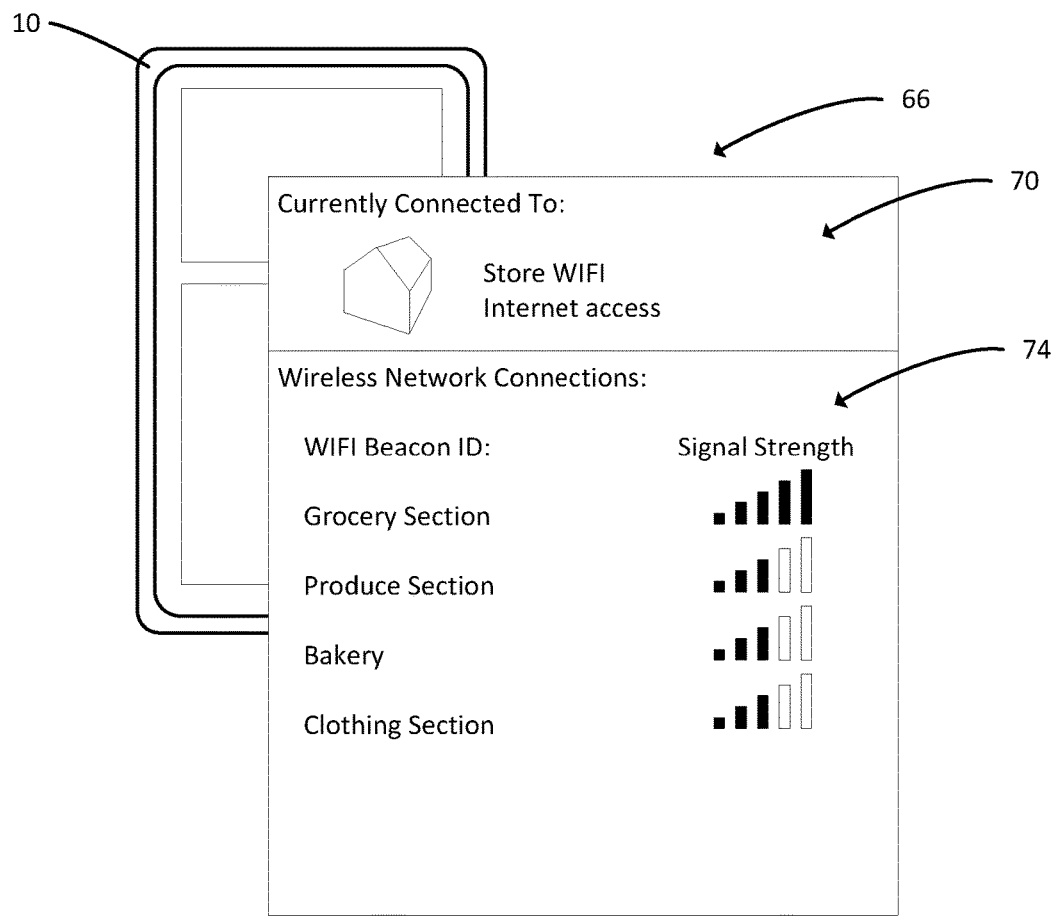
FIG. 4 is a drawing illustrating aspects of an embodiment of mobile-shopping software on a mobile electronic device.

FIG. 4 shows a mobile electronic device 10 such as a mobile phone which has mobile-shopping software 66 loaded thereon. The mobile electronic device 10 may be used by a customer who is shopping in store 22. The device 10 and mobile-shopping software 66 may, as discussed herein, detect and communicate with WIFI devices in the store 22. The software 66 may authenticate the device 10 to the WIFI access point 54 when the mobile electronic device 10 is in range of the WIFI access point 54; typically inside of the store 22. The mobile-shopping software 66 may thus receive, store, or transmit information 70 regarding the connection status of the mobile electronic device 10 and may alert the server 14 that the mobile electronic device 10 is within range of the WIFI access point 54.

The software 66 may also determine if the mobile electronic device 10 is within range of one or more WIFI beacons 58. The mobile-shopping software 66 may thus receive, store, or transmit information 74 regarding whether the mobile electronic device 10 is within range of any WIFI beacons 58 as well as information regarding the signal strength of any such WIFI beacons 58. The mobile-shopping software 66 may, via the mobile electronic device 10 and WIFI access point 54, alert the server 14 that the mobile electronic device 10 is within range of particular WIFI beacons 58.

Figure 5:
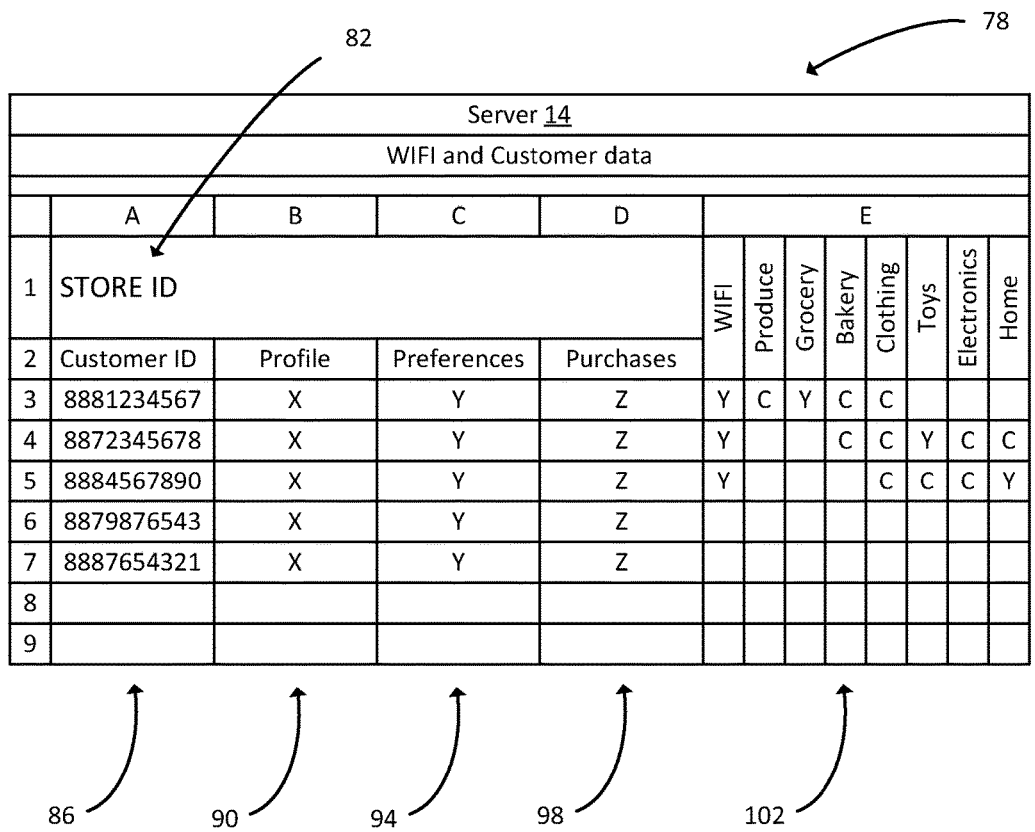
FIG. 5 is a drawing illustrating aspects of an example server and server data.

Referring now to FIG. 5, server data 78 on a server 14 is shown. The server 14 may receive, store, process, and transmit various types of data to facilitate communication with a customer mobile electronic device 10 while the customer is in a store 22. The data 78 may include store identification data 82 to identify a particular store 22 if the store is part of a larger organization. The data 78 may also include customer identification information 86. This customer identification may correspond to a customer account with the server and associated with the mobile-shopping software 66. The customer identification 86 may be an identification number of the mobile device 10. The data 78 may also include customer profile information 90. Customer profile information 90 may include the customer's age, gender, etc.

The data 78 may also include customer preference information 94. The customer preference information 94 may include a customer's enrollment in or exclusion from promotional offers or the like. The data 78 may also include customer purchase information 98. The customer purchase information 98 may include purchase history and may be updated from a store POS system. The customer purchase information may also be associated with use or expiration data for purchased products. The data 78 may also include WIFI network information 102. The WIFI network information 102 may include data regarding whether a mobile device 10 is connected to a store WIFI access point 54 as well as whether a mobile electronic device 10 is within range of one or more WIFI beacons 58. The WIFI network information 102 may include a determination (based on availability and signal strength information of WIFI beacons 58) of whether a mobile electronic device 10 is likely to be inside of a particular section of the store 22 (indicated by a Y in the data) and whether a mobile electronic device 10 is likely to be close to a section of the store (indicated by a C in the data).

The server 14 may use the data 78 to send communications to customer mobile electronic devices 10. Particularly, the server 14 may use actual customer location within a store 22 in sending communications regarding store products which are relevant to the customer. The server 14 may combine actual customer location in a store 22 with customer preferences, purchase history, and other information in sending communications to a customer mobile electronic device 10. The server 14 as well as local store managers may push messages to the electronic device 10.

Figure 6:
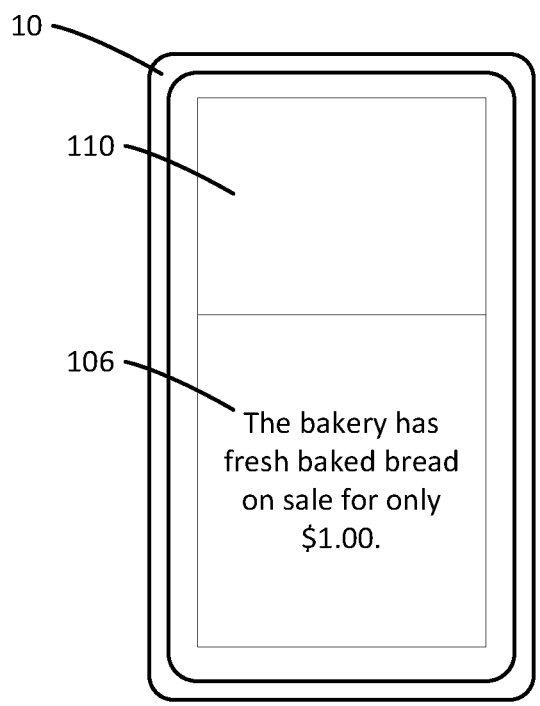
FIG. 6 is a drawing of an embodiment of a mobile electronic device.

FIG. 6 shows a mobile electronic device 10 (such as a mobile phone) having mobile-shopping software 66 loaded thereon. The mobile electronic device 10 may display notifications 106 from the server 14 on the screen 110 of the mobile device 10. While shopping, the customer may move throughout the store 22 selecting items for purchase and these notifications 106 may be tied to the customer's location in the store 22, as determined by the proximity of the mobile electronic device 10 to the WIFI beacons 58.

In one example a notification 106 may be a timely general message for customers who are actually in the store 22. Such a message might be: Freshly baked bread has just been put out and it's only $1. Such a message might primarily be based on a mobile electronic device 10 being connected to a WIFI access point 54 in the store 22, but may also be based on the device 10 being within range of a WIFI beacon 58 in the bakery.

Another example notification 106 might be based on the customer's purchase history. Such a notification might be: Frozen chicken is on sale for $1.29 per pound. These notifications may be based on a mobile device 10 being connected to a WIFI access point 54, WIFI beacons 58, and a customer's past purchases. The server 14 can track a customer's past transactions and notify the customer of items which they have previously purchased which happen to be on sale while the customer is at the store 22.

Another example notification 106 might involve a limited time or limited quantity offer. Such a notification might be: Here's a coupon for baked beans that you can use in the next 2 hours. Such a notification 106 can alert customers who are in a particular section of the store 22 of special offers or sales. Another such notification might be: Buy 3 toy cars and get a 4th free! Such a notification may be based on a mobile electronic device being in or near the toy section and may also be based on past purchase history. The server 14 may tie notifications 106 to age ranges or intended users of previously purchased items.

Another example notification 106 might alert a customer to store activities. Such a notification might be: Don't forget the Father's Day BBQ tomorrow! Free hot dogs for dads! These notifications 106 might be delivered to a customer's mobile electronic device 10 as they are in associated sections of the store such as the grocery section or as the customer enters the checkout area of the store 22.

Figure 7:
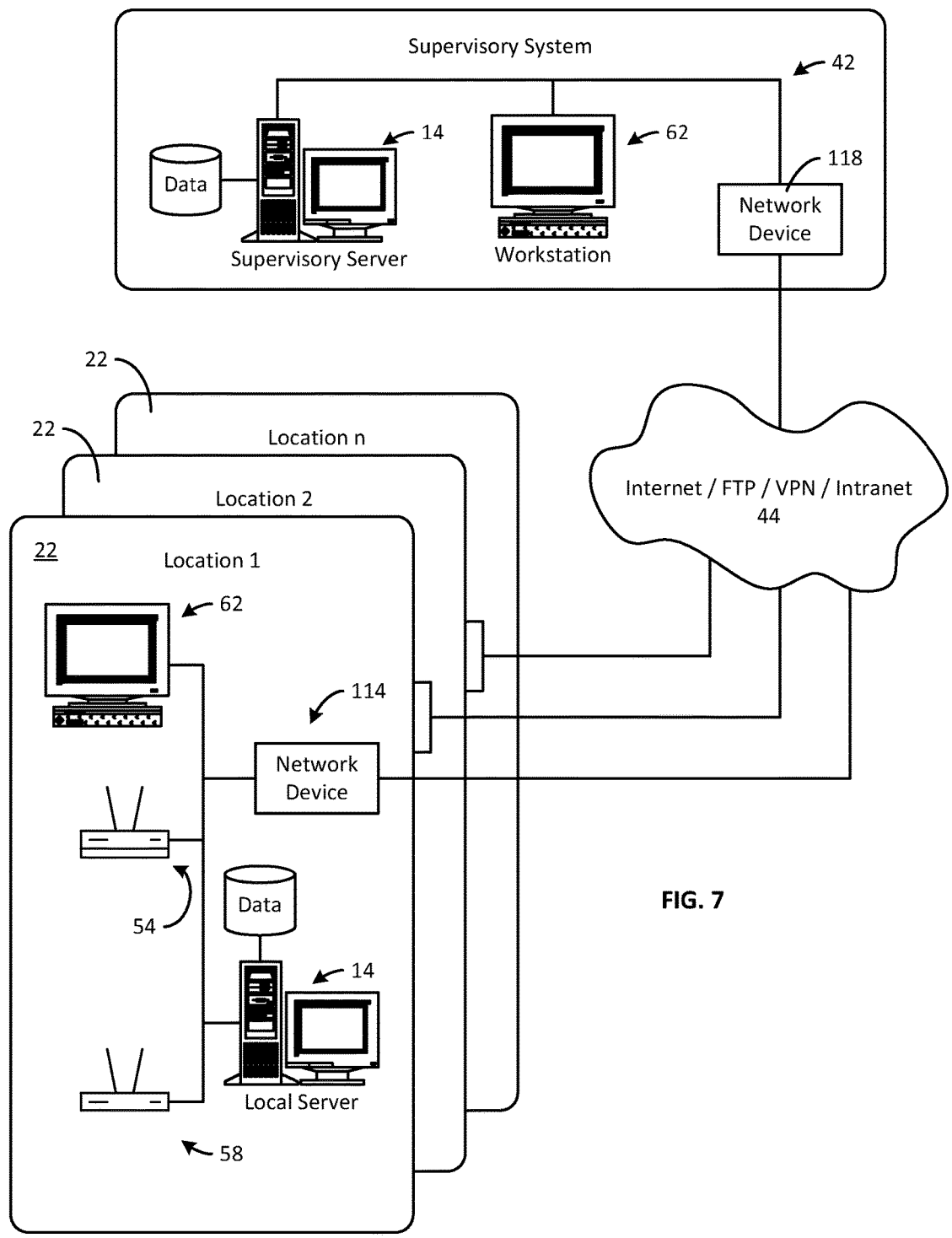
FIG. 7 is a schematic of an example store computer system.

Referring to FIG. 7, in selected embodiments, a store computer system may operate substantially independently, as a stand-alone unit. Alternately, a store computer system may be one of several similar store computer systems forming part of a larger system. For example, multiple stores 22 and associated store computer systems may be connected to each other and to a larger area supervisory system via network devices 114, LAN/WAN/internet 44, and network device 118.

A local server 14 may support the operation of the associated WIFI devices 54, 58 and sending communications 106 to customer electronic devices 10. Alternatively, or in addition thereto, a remote server 14 may support sending notifications 106 to customer mobile electronic devices 10. For example, a supervisory server 14 may receive and compile data from the various WIFI access points 54 and WIFI beacons 58 located in multiple stores 22 to provide or support the transmission of notifications 106 to customer mobile electronic devices 10.

Where multiple stores 22 and multiple store computer systems operate within an enterprise-wide system, each store 22 may have sufficient computer devices such as a server 14 connected by a computer network so as to enable the store computer system to provide notifications 106 to a customer device 10. The store computer system of each such store 22 may interact with and be directed by the supervisory systems. For example, multiple store locations 22 may report to an associated "headquarters" location or system.

A supervisory system 32 may comprise one or more supervisory servers 14, databases, workstations 62, network devices 118, or the like or combinations or sub-combinations thereof. The various components of a supervisory system may be interconnected via a computer network 42.

It is thus appreciated that in discussing the functionality of the various store computer systems and supervisory systems, the examples described herein may be implemented in a system contained within a single location or across multiple locations. By way of example, the functionality accomplished by a server or computer, such as storing, processing, and transmitting/sending receipt information, may be accomplished by a local computer or a remote computer.

Figure 8:
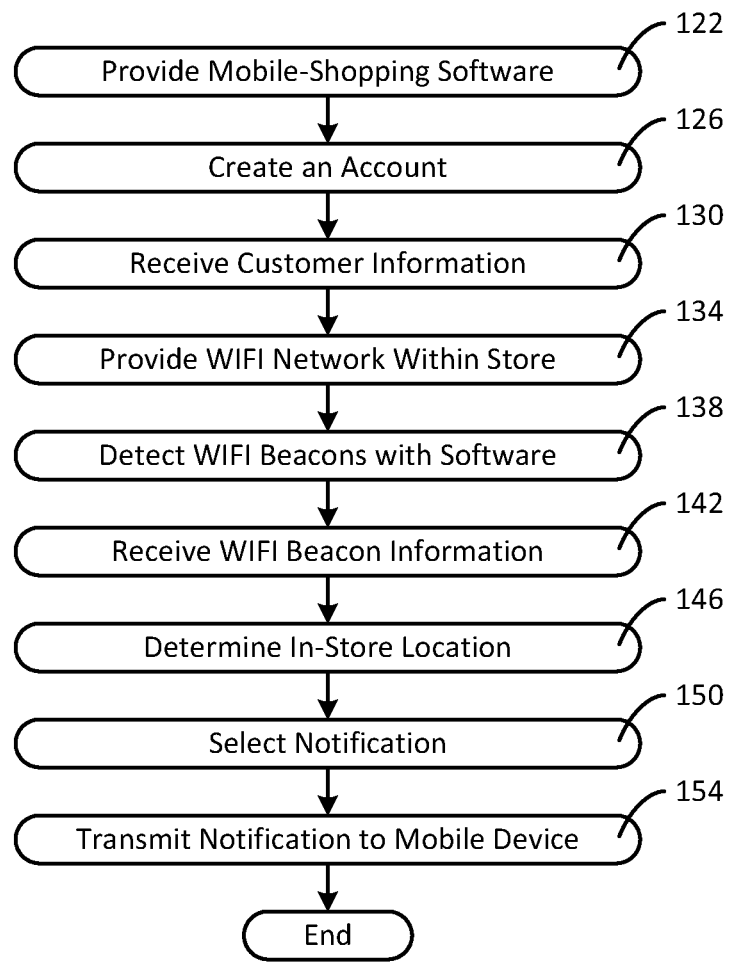
FIG. 8 is a flow chart illustrating an example of transmitting a notification to a customer.

FIG. 8 generally illustrates providing notifications 106 to a customer mobile electronic device 10. A store may decide to provide customized notifications to customers who are shopping in the store. To facilitate providing these notifications 106 to a customer, the store may provide 122 mobile-shopping software 66 to one more customers. The store may create 126 a customer account which contains 130 identification, preference, history, and other information regarding the customer and associated with a customer mobile electronic device 10.

The store 22 may further provide 134 a WIFI network in the store 22. The WIFI network may include a WIFI access point 54 as well as one or more WIFI beacons 58. The mobile-shopping software may then detect 138 WIFI beacons via the mobile electronic device hardware. Specifically, the software may use the WIFI communications hardware on the device 10 to detect WIFI networks which are in range (i.e. the WIFI beacons) and may detect a signal strength of these beacons. The server 14 may receive 142 information regarding the store WIFI network from the mobile electronic device 10. The server 14 may receive information as to surrounding networks (WIFI beacons 58) which are in range as well as signal strength for these WIFI beacons.

The server 14 may determine 146 an in-store location of the mobile electronic device 10 from the WIFI beacon information. The server 14 may determine what section of a store a mobile electronic device 10 (and the associated customer) is in based on which WIFI beacons are detected by the mobile electronic device. The server 14 may use signal strength to assist in determining the in-store location of the device 10. The server may then select 150 a notification 106 to transmit to the mobile electronic device. The notification 106 may be based on the current location of the device 10 within the store 22, and may include offers or notifications regarding products which the customer has previously purchased. The server 14 may then transmit 154 the notification 106 to the mobile electronic device 10. The server 14 may use the WIFI access point 54 to transmit the notification 106 to the device 10.

Figure 9:
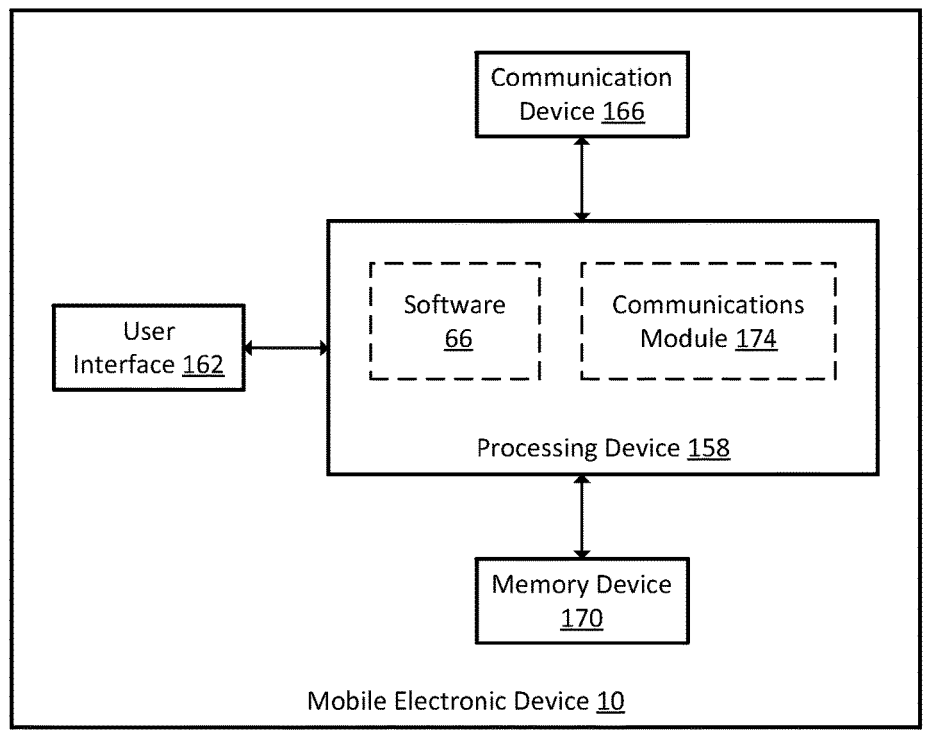
FIG. 9 is a schematic illustrating example components of a mobile electronic device.

Referring now to FIG. 9, a schematic illustrating example components of the mobile electronic device 10 is illustrated. The mobile electronic device includes a processing device 158, a user interface 162, a communication device 166, and a memory device 170. It is noted that the mobile electronic device 10 can include other components and some of the components are not required.

The processing device 158 can include memory, e.g., read only memory (ROM) and random access memory (RAM), storing processor-executable instructions and one or more processors that execute the processor-executable instructions. In embodiments where the processing device 158 includes two or more processors, the processors can operate in a parallel or distributed manner. The processing device 158 can execute the operating system of the mobile electronic device 10. In the illustrative example, the processing device 158 also executes software 66 such as mobile-shopping software and a communications module 174.

The user interface 162 is a device that allows a user, a customer in particular, to interact with the mobile electronic device 10. While one user interface 162 is shown, the term "user interface" can include, but is not limited to, a touch screen, a physical keyboard, a mouse, a microphone, and/or a speaker. The communication device 166 is a device that allows the mobile electronic device 10 to communicate with another device, e.g., the server 14. The communication device 166 can include one or more wireless transceivers for performing wireless communication and/or one or more communication ports for performing wired communication. The memory device 170 is a device that stores data generated or received by the mobile electronic device 10. The memory device 170 can include, but is not limited to, a hard disc drive, an optical disc drive, and/or a flash memory drive. The software 66 may be stored on the memory device 170 and the communications module 174 may be created from or operated with the software 66. The communications module 174 allows a user, a customer in particular, to receive personalized notifications 106 from the server 14 as described.

Figure 10:
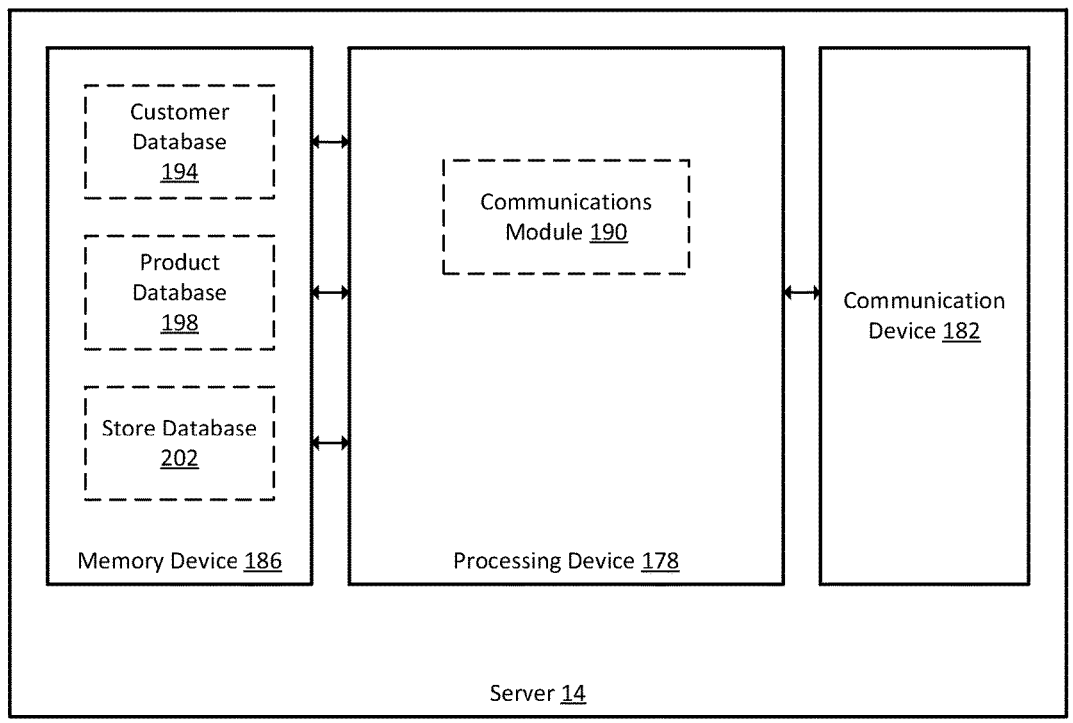
FIG. 10 is a schematic illustrating example components of a server.

As referenced above, the server 14 may be configured to perform one or more functions at the request of the mobile electronic device 10 and, according to various computing models, may execute some or all of the functions associated with the mobile electronic device 10 receiving notifications 106 from the server 14. FIG. 10 illustrates an example embodiment of the server 14 configured to perform one or more of the requested functions. In the illustrated embodiment, the server 14 may include a processing device 178, a communication device 182, and a memory device 186.

The processing device 178 can include memory, e.g., read only memory (ROM) and random access memory (RAM), storing processor-executable instructions and one or more processors that execute the processor-executable instructions. In embodiments where the processing device 178 includes two or more processors, the processors can operate in a parallel or distributed manner. In the illustrative embodiment, the processing device 178 executes a communications module 190. The communications module 190 can facilitate the transmission of notifications 106 to a customer via a mobile electronic device 10 as discussed herein.

The communication device 182 is a device that allows the server 14 to communicate with another device, e.g., the mobile electronic device 10. The communication device 182 can include one or more wireless transceivers for performing wireless communication and/or one or more communication ports for performing wired communication.

The memory device 186 is a device that stores data generated by or received by the server 14. The memory device 186 can include, but is not limited to a hard disc drive, an optical disc drive, and/or a flash memory drive. Further, the memory device 186 may be distributed and located at multiple locations. The memory device 186 is accessible to the processing device 178. In some embodiments, the memory device 186 stores a customer database 194, a product database 198, and a store database 202.

In some embodiments, the customer database 194 can store information associated with a customer. The customer database may, for example, store information associated with a customer account and may include account preferences and customer contact information. The customer database may also store information regarding particular items which have been purchased by the particular customer. The customer database 194 may be queried by the processing device 178 and may provide information to the processing device to facilitate identifying a customer, customer preferences, and customer purchase history and to transmission of notifications 106 to the customer.

In some embodiments, the product database 198 stores item information associated with products or types of products for sale at a store 22. For example, the product database 198 may store information regarding products which are on sale at a store 22. The product database 198 may be queried by the processing device 178 and may transmit information to the processing device 178 to facilitate the use of product data.

In some embodiments, the store database 202 stores information associated with the store 22. For example, the store database 202 may store the data associated with the WIFI access point 54 and the WIFI beacons 58. The store database 202 may be queried by the processing device 178 and may transmit information to the processing device to facilitate the use of store data, such as in identifying WIFI beacons which are in range of the customer mobile electronic device 10 and in selecting notifications 106 which are appropriate for the customers.

The processing device 178 may execute the communications module 190. The communications module 190 may receive in-range WIFI beacon information, determine customer location in a store 22, determine customer product purchase history, prepare notifications 106, transmit notifications 106 to a customer mobile electronic device, etc. The communications module 190 may facilitate sending notifications 106 which are relevant to the customer's current location within a store 22 to customers.

The examples discussed provide significant advantages. Customers are able to receive, via a mobile electronic device, notifications from a store server as they are shopping in the store. Additionally, the customer is able to receive notifications which are relevant to the section of the store where they are currently shopping and to their personal preferences and shopping habits. The system can operate with minimal to no input or configuration from the customer. Additionally, the system can be deployed as software only on the customer side with full compatibility with existing wireless mobile electronic devices.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer implemented method comprising:
   detecting, with a computer system, the computer system of a retailer using two or more processors operating in a parallel manner, a mobile-shopping software application ("app") installed on a mobile electronic device of a customer entering a brick and mortar store of the retailer;
   responsive to the customer entering the brick and mortar store of the retailer, connecting, via a wireless network installed throughout the brick and mortar store, the mobile electronic device with a server of the retailer, wherein the mobile-shopping software app on the mobile electronic device is configured to receive information transmitted from the wireless network and wherein the mobile-shopping software app on the mobile electronic device is in data communication with the server of the retailer;
   transmitting, by beacons located throughout the brick and mortar store, signals broadcast in a broadcast range greater than a size of the brick and mortar store to be detected by the mobile electronic device of the customer, wherein each beacon of the beacons is correlated to its own particular store location on a store layout of the brick and mortar store, wherein detection of the signals by the mobile electronic device is transmitted to the server to track a location of the mobile electronic device of the customer while the customer is moving throughout the brick and mortar store;
   determining, by the server, a customer location of the customer by tracking the location of the mobile electronic device of the customer within the brick and mortar store, wherein the server determines the customer location based on (a) whether the mobile electronic device is within range of a particular beacon of the beacons on the store layout and (b) a signal strength of the particular beacon detected by the mobile-shopping software app on the mobile electronic device to be higher than another signal strength of another beacon of the beacons also detected by the mobile-shopping software app on the mobile electronic device;
   determining, by the server, (a) a first department within the brick and mortar store corresponding to the location of the mobile electronic device of the customer and (b) a second department adjacent to the first department;
   transmitting, by a point of sale ("POS") system to the server, one or more purchase transactions made by the customer, wherein the one or more purchase transactions involve items previously purchased by the customer, wherein the server is in data communication with the POS system to receive the one or more purchase transactions of the customer;
   determining, by the server, product information comprising (a) the items previously purchased by the customer and corresponding to the second department or (b) items preferred by the customer and corresponding to the second department, wherein a purchase history of the customer comprises the items previously purchased by the customer and, wherein customer preferences of the customer comprise the items preferred by the customer;
   identifying, by the server, the customer location of the customer together with the customer preferences and the purchase history of the customer to select a notification of one or more notifications, the notification comprising a discount personalized for the customer for (a) at least one product from the second department, wherein the at least one product was previously purchased or is preferred by the customer, or (b) at least one product in the second department being discounted for a limited time while the customer is in the brick and mortar store; and
   transmitting, by the server, the notification to a graphical user interface of the mobile-shopping software app of the mobile electronic device of the customer.

2. The computer implemented method of claim 1, wherein the wireless network is a WIFI network that comprises a WIFI beacon which broadcasts a unique network identification signal and which does not permit customer WIFI access, and wherein the beacons comprise the WIFI beacon.

3. The computer implemented method of claim 2, wherein determining the location of the mobile electronic device of the customer within the brick and mortar store comprises, with the wireless network, determining, from a network identification data of the wireless network, a proximity of the mobile electronic device to the WIFI beacon from an identified network signal strength of the WIFI beacon.

4. The computer implemented method of claim 2, wherein the WIFI network further comprises a WIFI access point which provides WIFI access to the mobile electronic device.

5. The computer implemented method of claim 4, wherein the computer implemented method further comprises, with a communications device, transmitting the notification to the mobile electronic device via the WIFI access point.

6. The computer implemented method of claim 1, wherein the wireless network is a WIFI network that comprises multiple WIFI beacons, and each WIFI beacon of the multiple WIFI beacons (1) broadcasts a unique network identification signal and (2) does not permit customer WIFI access to the mobile electronic device of the customer, and wherein the beacons comprise the multiple WIFI beacons.

7. The computer implemented method of claim 6, wherein:
each WIFI beacon of the multiple WIFI beacons has a broadcast range which does not cover all of the brick and mortar store; and
determining the customer location of the customer comprises determining the customer location of the customer based on detection of some of the multiple WIFI beacons, but not all of the multiple WIFI beacons, by the mobile electronic device.

8. The computer implemented method of claim 6, wherein determining the location of the mobile electronic device of the customer within the brick and mortar store further comprises, with the wireless network, determining the location of the mobile electronic device of the customer, and detected by the mobile-shopping software app on the mobile electronic device within the brick and mortar store, based on signal strength of the multiple WIFI beacons.

9. The computer implemented method of claim 1, wherein:
the server further includes a customer database stored in a memory device;
the computer implemented method further comprises, with the computer system, storing within the customer database a customer profile associated with the customer;
the customer profile includes the purchase history of the customer; and
the notification further comprises additional information regarding products previously purchased by the customer.

10. The computer implemented method of claim 1, wherein:
the wireless network is a WIFI network that comprises multiple WIFI beacons, and each WIFI beacon of the multiple WIFI beacons (1) broadcasts a unique network identification signal and (2) does not permit customer WIFI access to the mobile electronic device of the customer, wherein the beacons comprise the WIFI beacon;
each WIFI beacon of the multiple WIFI beacons has a broadcast range which does not cover all of the brick and mortar store;

determining the customer location of the customer comprises determining the customer location of the customer based on:
detection of some of the multiple WIFI beacons, but not all of the multiple WIFI beacons, by the mobile electronic device; and
signal strength of the some of the multiple WIFI beacons;
the server further includes a customer database stored in a memory device;
the computer implemented method comprises, with the computer system, storing within the customer database a customer profile associated with the customer;
the customer profile includes the purchase history of the customer; and
the notification further comprises additional information regarding products previously purchased by the customer.

11. A computer system comprising:
one or more processors; and
memory storing one or more programs to be executed by the one or more processors, the one or more programs comprising instructions for:
detecting the computer system of a retailer using two or more processors operating in a parallel manner, a mobile-shopping software application ("app") installed on a mobile electronic device of a customer entering a brick and mortar store of the retailer;
responsive to the customer entering the brick and mortar store of the retailer, connecting, via a wireless network installed throughout the brick and mortar store, the mobile electronic device with a server of the retailer, wherein the mobile-shopping software app on the mobile electronic device is configured to receive information transmitted from the wireless network and wherein the mobile-shopping software app on the mobile electronic device is in data communication with the server of the retailer;
transmitting, by beacons located throughout the brick and mortar store, signals broadcast in a broadcast range greater than a size of the brick and mortar store to be detected by the mobile electronic device of the customer, wherein each beacon of the beacons is correlated to its own particular store location on a store layout of the brick and mortar store, wherein detection of the signals by the mobile electronic device is transmitted to the server to track a location of the mobile electronic device of the customer while the customer is moving throughout the brick and mortar store;
determining a customer location of the customer by tracking the location of the mobile electronic device of the customer within the brick and mortar store, wherein the customer location based on (a) whether the mobile electronic device is within range of a particular beacon of the beacons on the store layout and (b) a signal strength of the particular beacon detected by the mobile-shopping software app on the mobile electronic device to be higher than another signal strength of another beacon of the beacons also detected by the mobile-shopping software app on the mobile electronic device;
determining (a) a first department within the brick and mortar store corresponding to the location of the mobile electronic device of the customer and (b) a second department adjacent to the first department;

transmitting, by a point of sale ("POS") system to the server, one or more purchase transactions made by the customer, wherein the one or more purchase transactions involve items previously purchased by the customer, wherein the server is in data communication with the POS system to receive the one or more purchase transactions of the customer;

determining product information comprising (a) the items previously purchased by the customer and corresponding to the second department or (b) items preferred by the customer and corresponding to the second department, wherein a purchase history of the customer comprises the items previously purchased by the customer and, wherein customer preferences of the customer comprise the items preferred by the customer;

identifying the customer location of the customer together with the customer preferences and the purchase history of the customer to select a notification of one or more notifications comprising a discount personalized for the customer for (a) at least one product from the second department, wherein the at least one product was previously purchased or is preferred by the customer or (b) at least one product in the second department being discounted for a limited time while the customer is in the brick and mortar store; and transmitting the notification to a graphical user interface of the mobile-shopping software app of the mobile electronic device of the customer.

12. The computer system of claim 11, wherein the wireless network is a WIFI network that comprises a WIFI beacon which broadcasts a unique network identification signal and which does not permit customer WIFI access, and wherein the beacons comprise the WIFI beacon.

13. The computer system of claim 12, wherein, to determine, from a network identification data of the wireless network in the brick and mortar store, the location of the mobile electronic device of the customer within the brick and mortar store, the wireless network is programmed to determine a proximity of the mobile electronic device of the customer to the WIFI beacon from an identified network signal strength of the WIFI beacon.

14. The computer system of claim 12, wherein the WIFI network further comprises a WIFI access point which provides WIFI access to the mobile electronic device.

15. The computer system of claim 14, wherein a communications device is programmed to transmit the notification to the mobile electronic device via the WIFI access point.

16. The computer system of claim 11, wherein the wireless network is a WIFI network that comprises multiple WIFI beacons, and each WIFI beacon of the multiple WIFI beacons (1) broadcasts a unique network identification signal and (2) does not permit customer WIFI access to the mobile electronic device of the customer, and wherein the beacons comprise the multiple WIFI beacons.

17. The computer system of claim 16, wherein:
each WIFI beacon of the multiple WIFI beacons has a broadcast range which does not cover all of the brick and mortar store; and
to determine the customer location of the customer comprises determining the customer location of the customer based on detection of some of the multiple WIFI beacons, but not all of the multiple WIFI beacons, by the mobile electronic device.

18. The computer system of claim 16, wherein to determine the location of the mobile electronic device of the customer further comprises, the wireless network is programmed to determine the location of the mobile electronic device of the customer detected by the mobile-shopping software app on the mobile electronic device within the brick and mortar store based on signal strength of the multiple WIFI beacons.

19. The computer system of claim 11, wherein:
the server further includes a customer database stored in a memory device;
the computer system is further programmed to store within the customer database a customer profile associated with the customer;
the customer profile includes the purchase history of the customer; and
the notification further comprises additional information regarding products previously purchased by the customer.

20. The computer system of claim 11, wherein:
the wireless network is a WIFI network that comprises multiple WIFI beacons, and each WIFI beacon of the multiple WIFI beacons (1) broadcasts a unique network identification signal and (2) does not permit customer WIFI access;
each WIFI beacon of the multiple WIFI beacons has a broadcast range which does not cover all of the brick and mortar store, wherein the beacons comprise the WIFI beacon;
to determine the customer location comprises determining the customer location of the customer based on:
detection of some of the multiple WIFI beacons, but not all of the multiple WIFI beacons, by the mobile electronic device; and
signal strength of the some of the multiple WIFI beacons;
the server further includes a customer database stored in a memory device;
the computer system is further programmed to store within the customer database a customer profile associated with the customer;
the customer profile includes the purchase history of the customer; and
the notification further comprises additional information regarding products previously purchased by the customer.

* * * * *